US012760389B2

(12) United States Patent
Ravenelle et al.

(10) Patent No.: US 12,760,389 B2
(45) Date of Patent: Oct. 13, 2026

(54) SOLVENT EXTRACTION FOR SELECTIVE LITHIUM RECOVERY

(71) Applicant: Lithium Nevada LLC, Reno, NV (US)

(72) Inventors: Ryan Michael Ravenelle, Reno, NV (US); Hugh Anthony Broadhurst, Reno, NV (US); Rene LeBlanc, Johns Creek, GA (US); Clio Deferm, Schulen (BE); Viet Tu Nguyen, Heverlee (BE); Sofía Riaño Torres, Mechelen (BE); Koen Binnemans, Zele (BE)

(73) Assignee: Lithium Nevada LLC, Reno, NV (US)

( * ) Notice: Subject to any disclaimer, the term of this patent is extended or adjusted under 35 U.S.C. 154(b) by 805 days.

(21) Appl. No.: 18/098,563

(22) Filed: Jan. 18, 2023

(65) Prior Publication Data

US 2024/0240280 A1 Jul. 18, 2024

(51) Int. Cl.

| | |
|---|---|
| ***C22B 3/02*** | (2006.01) |
| ***C01D 15/02*** | (2006.01) |
| ***C01D 15/08*** | (2006.01) |
| ***C22B 3/26*** | (2006.01) |
| ***C22B 26/10*** | (2006.01) |
| ***C22B 26/12*** | (2006.01) |

(52) U.S. Cl.

CPC ................ *C22B 3/26* (2021.05); *C01D 15/02* (2013.01); *C01D 15/08* (2013.01); *C22B 3/02* (2013.01); *C22B 26/10* (2013.01); *C22B 26/12* (2013.01)

(58) Field of Classification Search

None

See application file for complete search history.

(56) References Cited

U.S. PATENT DOCUMENTS

| | | | |
|---|---|---|---|
| 2,516,109 | A | 7/1950 | Ellestad et al. |
| 2,608,465 | A | 8/1952 | Henderson |
| 2,801,153 | A | 7/1957 | Dwyer |
| 2,923,600 | A | 2/1960 | Maurice et al. |

(Continued)

FOREIGN PATENT DOCUMENTS

| | | |
|---|---|---|
| CA | 3014623 | 8/2017 |
| CL | 33867 | 7/1983 |

(Continued)

OTHER PUBLICATIONS

Rabe, Brett; Examination Report for Chile application No. 2442-2021, filed Mar. 23, 2020, mailed Dec. 7, 2023, 21 pgs.

(Continued)

*Primary Examiner* — Jennifer A Leung
(74) *Attorney, Agent, or Firm* — Buchalter LLP

(57) ABSTRACT

An lithium extraction process can include a solvent extraction unit configured to receive an aqueous feed stream from an upstream flow path, the aqueous feed stream including lithium cations and at least one additional monovalent species of cation; a waste-salt separation unit configured to receive an aqueous waste-water stream from a first downstream flow path, the first downstream flow path connecting the waste-salt separation unit in fluid communication with the solvent extraction unit; and a lithium carbonate production unit configured to receive an aqueous lithium-rich stream from a second downstream flow path, the second downstream flow path connecting the lithium carbonate production unit in fluid communication with the solvent extraction unit.

12 Claims, 6 Drawing Sheets

(56) References Cited

U.S. PATENT DOCUMENTS

| | | | |
|---|---|---|---|
| 2,972,517 A | 2/1961 | Macewan | |
| 3,007,770 A | 11/1961 | Kawecki et al. | |
| 3,649,219 A | 3/1972 | Lynn et al. | |
| 3,793,433 A | 2/1974 | Seeley et al. | |
| 4,287,163 A | 9/1981 | Garrett et al. | |
| 4,587,106 A | 5/1986 | Bauer et al. | |
| 5,682,593 A | 10/1997 | Holzner et al. | |
| 8,431,005 B1 | 4/2013 | Zbranek et al. | |
| 8,444,744 B2 | 5/2013 | Narisako et al. | |
| 8,936,711 B2 | 1/2015 | Chon et al. | |
| 9,034,294 B1 | 5/2015 | Harrison | |
| 9,147,918 B2 | 9/2015 | Ueda | |
| 9,187,804 B2 | 11/2015 | Ishida et al. | |
| 9,410,227 B2 | 8/2016 | Boudreault et al. | |
| 9,677,152 B2 | 6/2017 | Asano et al. | |
| 9,677,153 B2 | 6/2017 | Wohlgemuth et al. | |
| 9,725,787 B2 | 8/2017 | Laitala et al. | |
| 9,926,618 B2 | 3/2018 | Li et al. | |
| 9,963,760 B2 | 5/2018 | Hu et al. | |
| 9,994,931 B2 | 6/2018 | Chon et al. | |
| 10,865,462 B2 | 12/2020 | Ito et al. | |
| 10,894,997 B2 | 1/2021 | Johnson et al. | |
| 10,975,478 B2 | 4/2021 | Lipp et al. | |
| 11,066,356 B2 | 7/2021 | De Souza et al. | |
| 11,247,189 B2 | 2/2022 | Riabtsev et al. | |
| 11,339,481 B1 | 5/2022 | Ehren | |
| 12,188,107 B2 | 1/2025 | Rabe et al. | |
| 2002/0127173 A1 | 9/2002 | Bulan et al. | |
| 2011/0066356 A1 | 3/2011 | Ogura | |
| 2017/0233848 A1 | 8/2017 | Johnson et al. | |
| 2019/0185963 A1 | 6/2019 | Johnson et al. | |
| 2019/0330712 A1 | 10/2019 | Wang | |
| 2019/0379088 A1 | 12/2019 | Schmidt et al. | |
| 2020/0010334 A1 | 1/2020 | Pellenbarg et al. | |
| 2020/0044295 A1 | 2/2020 | Arakawa et al. | |
| 2020/0048733 A1 | 2/2020 | Moya et al. | |
| 2020/0048736 A1 | 2/2020 | Dixon et al. | |
| 2020/0165699 A1 | 5/2020 | Snydacker et al. | |
| 2020/0239981 A1 | 7/2020 | Ariyoshi et al. | |
| 2020/0263277 A1 | 8/2020 | Patwardhan et al. | |
| 2020/0346137 A1 | 11/2020 | Palsdottir et al. | |
| 2020/0392602 A1 | 12/2020 | Xu | |
| 2020/0399735 A1 | 12/2020 | Sams et al. | |
| 2020/0399737 A1 | 12/2020 | Tran et al. | |
| 2021/0108285 A1 | 4/2021 | Arakawa | |
| 2021/0108286 A1 | 4/2021 | Arakawa et al. | |
| 2021/0130927 A1 | 5/2021 | Bender et al. | |
| 2021/0172041 A1 | 6/2021 | Duyvesteyn | |
| 2021/0214254 A1 | 7/2021 | De Souza et al. | |
| 2021/0246529 A1 | 8/2021 | Jariwala et al. | |
| 2021/0265678 A1 | 8/2021 | Azimi et al. | |
| 2022/0205064 A1 * | 6/2022 | Szolga, Jr. .............. | C22B 7/007 |
| 2022/0220578 A1 | 7/2022 | Rabe et al. | |
| 2022/0380917 A1 | 12/2022 | Dara | |
| 2023/0175100 A1 * | 6/2023 | Jablonka .................. | C25D 1/02<br>423/179.5 |
| 2023/0313338 A1 | 10/2023 | Grande et al. | |
| 2025/0011899 A1 | 1/2025 | Rabe et al. | |

FOREIGN PATENT DOCUMENTS

| | | | |
|---|---|---|---|
| CL | 201801689 | 7/2018 | |
| CL | 201900483 | 8/2019 | |
| CN | 100503849 | 6/2009 | |
| CN | 102041380 B | 11/2011 | |
| CN | 103849761 | 6/2014 | |
| JP | 2019508587 | 3/2019 | |
| KR | 101158527 | 1/2012 | |
| WO | 2017139852 A1 | 8/2017 | |
| WO | WO-2017137885 A1 * | 8/2017 | ............... C22B 3/32 |
| WO | 2017200408 | 11/2017 | |
| WO | 2020205302 | 10/2020 | |
| WO | 2024155455 | 7/2024 | |

OTHER PUBLICATIONS

Rabe, Brett; Office Action for Canadian patent application No. 3,134,664, filed Mar. 23, 2020, mailed Dec. 1, 2023, 5 pgs.

Examination Report for Chile Application No. 20210002442, dated Oct. 30, 2024, 3 pages.

Notice of Allowance for U.S. Appl. No. 17/442,961, dated Nov. 18, 2024, 11 Pages.

Office Action for Canadian Application No. 3134664, dated Nov. 21, 2024, 5 pages.

Rabe, Brett; Office Action for Chinese application No. 202080034650.1, filed Mar. 23, 2020, mailed Jan. 18, 2023, 29 pgs.

Ravenelle, Ryan Michael; International Search Report and Written Opinion for PCT Application No. PCT/US24/10415, filed Jan. 5, 2024, mailed May 30, 2024, 14 pgs.

Rabe, Brett A.; Notice of Allowance for U.S. Appl. No. 17/442,961, filed Sep. 24, 2021, mailed Jun. 20, 2024, 37 pgs.

Rabe, Brett; Office Action for Chinese application No. 202080034650.1, filed Mar. 23, 2020, mailed Jul. 22, 2023, 15 pgs.

Rabe, Brett; Examination Report for Chile application No. 2442-2021, filed Mar. 23, 2020, mailed Jun. 22, 2023, 23 pgs.

Garrett D., "Handbook of Lithium and Natural Calcium", Academic Press, 2004, located at <https://books.google.com/books?id=Ua2SVcUBHZgC&printsec=frontcover#v=onepage&q&f=false?>, p. 1.

Bertau, et al.; Article entitled: "Lithium Recovery from Challenging Deposits: Zinnwaldite and Magnesium-Rich Salt Lake Brines", Chembioeng Reviews, vol. 4, No. 6, Jan. 1, 2017, pp. 360-375, 17 pgs.

Rabe, Brett; Extended European Search report for application No. 20784373.1, filed Mar. 23, 2020, mailed Apr. 12, 2023, 78 pgs.

Hano, et al.; Article entitled: "Solvent Extraction and Ion Exchange", Department of Environment Chemistry and Engineering, Oita University, Oita, 870-11, Japan, published Jun. 25, 2007, 14 pgs.

Masmoudia, et al.; Article entitled: "Solvent extraction of lithium ions using benzoyltrifluoroacetone in new solvents", HAL archives-ouvertes, Dec. 7, 2020, 21 pgs.

Nguyen, et al.; Article entitled: "A Review on the Separation of Lithium Ion from Leach Liquors of Primary and Secondary Resources by Solvent Extraction with Commercial Extractants", Processes 2018, published May 12, 2018, 15 pgs.

Stringfellow, et al.; Article entitled: "Technology for Lithium Extraction in the Context of Hybrid Geothermal Power", Proceedings, 46th Workshop on Geothermal Reservoir Engineering, Stanford University, Stanford, California, Feb. 15-17, 2021, 20 pgs.

Zhang, et al.; Article entitled: "Recovery of lithium from alkaline brine by solvent extraction with B-diketone", Hydrometallurgy 174 (2018) 35-42, 8 pgs.

Bertau, et al.; "Lithium Recovery from Challenging Deposits: Zinnwaldite and Magnesium-Rich Salt Lake Brines," ChemBioEng Reviews 4.6 (Aug. 24, 2017): 360-376, 18 pgs.

Rabe, Brett A.; International Preliminary Report on Patentability for PCT/US20/24152, filed Mar. 23, 2020, mailed Oct. 14, 2021, 7 pgs.

Rabe, Brett A.; International Search Report and Written Opinion for PCT/US20/24152, filed Mar. 23, 2020, mailed Jun. 17, 2020, 7 pgs.

Non-Final Office Action for U.S. Appl. No. 18/890,246, dated Jan. 16, 2026, 13 pages.

Office Action for Chinese patent application No. 2020800346501, mailed Feb. 25, 2026, 14 pgs.

Ge Fei., Patent Navigation of Salt Lake Lithium Industry in China, Intellectual Property Publishing House, p. 17, Dec. 31, 2018, 7 Pages.

Notice of Allowance for U.S. Appl. No. 18/098,563, dated May 26, 2026, 12 pages.

Office Action for Chinese Patent Application No. 202080034650.1, dated May 25, 2026, 20 Pages.

Final Office Action for U.S. Appl. No. 18/890,246, dated May 5, 2026, 12 pages.

Notice of Allowance for U.S. Appl. No. 18/890,246, dated Jul. 13, 2026, 20 pages.

* cited by examiner

SOLVENT EXTRACTION FOR SELECTIVE LITHIUM RECOVERY

TECHNICAL FIELD

This disclosure relates to solvent extraction for selective lithium recovery. More specifically, this disclosure relates to solvent extraction for selective lithium recovery from a monovalent sulfate brine.

BACKGROUND

Lithium is a valuable mineral, which is commonly used in the production of batteries, glasses and ceramics, greases, and various other products. The largest use is the production of lithium-ion batteries, which are commonly used in electric vehicles, power grid storage, and portable electronic devices. In particular, the compounds of lithium carbonate ($Li_2CO_3$) and lithium hydroxide (LiOH) are utilized in the manufacture of batteries, and the processes require that the compounds be of very high purity with no more than trace levels of contaminants.

The required level of purity is difficult to achieve due to the nature of the extraction process. Lithium naturally occurs only as a compound, rather than an element. Lithium deposits generally are found at low concentration within certain rock formations, clays, and brines. In the case of rock and clay deposits, the ore is often treated with an acid, such as sulfuric acid, to leach the lithium into solution; however, numerous additional elements are co-extracted, depending upon the source. For example, aluminum, calcium, iron, potassium, magnesium, and sodium are commonly co-extracted from clay into the liquid leach brine, along with the desired lithium. Where sulfuric acid is utilized, the brine also contains a high sulfate concentration.

The majority of the aluminum, calcium, iron, and magnesium is typically removed by a combination of chemical and physical precipitation techniques, and subsequent purification techniques, such as ion exchange, are utilized to reduce these elements to trace levels. However, the resulting brine carries a mixture of lithium, potassium, and sodium, which cannot be utilized to directly produce lithium carbonate suitable for battery manufacturing due to the level of impurities without multiple subsequent purification steps.

In common practice, multiple steps are needed during lithium carbonate production to ensure that final product quality is achieved. Additionally, a step to remove sodium and potassium must take place after lithium carbonate is produced. These extras steps add process complexity and require extra equipment to build. Additionally, these steps increase consumption of energy and chemical inputs and result in losses of lithium in sulfate salts produced during waste-salt separation, such as in a zero-liquid discharge unit.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a lithium extraction process comprising: a solvent extraction unit configured to receive an aqueous feed stream from an upstream flow path, the aqueous feed stream comprising lithium cations and at least one additional monovalent species of cation; a waste-salt separation unit configured to receive an aqueous waste-water stream from a first downstream flow path, the first downstream flow path connecting the waste-salt separation unit in fluid communication with the solvent extraction unit; and a lithium carbonate production unit configured to receive an aqueous lithium-rich stream from a second downstream flow path, the second downstream flow path connecting the lithium carbonate production unit in fluid communication with the solvent extraction unit.

Also disclosed is a method for extracting lithium, the method comprising: processing an aqueous feed stream comprising lithium cations and at least one additional monovalent species of cation with a solvent extraction unit, comprising: contacting the aqueous feed stream with an organic solvent stream comprising at least one extractant to: extract the lithium cations from the aqueous feed stream to the organic solvent stream; and create an aqueous waste-water stream from the aqueous feed stream comprising the at least one additional monovalent species of cation; stripping the lithium cations from the organic solvent stream to an aqueous acid stream to create an aqueous lithium-rich stream; and separating waste salts from the aqueous waste-water stream in a linear process, the waste salts comprising the at least one additional monovalent species of cation.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
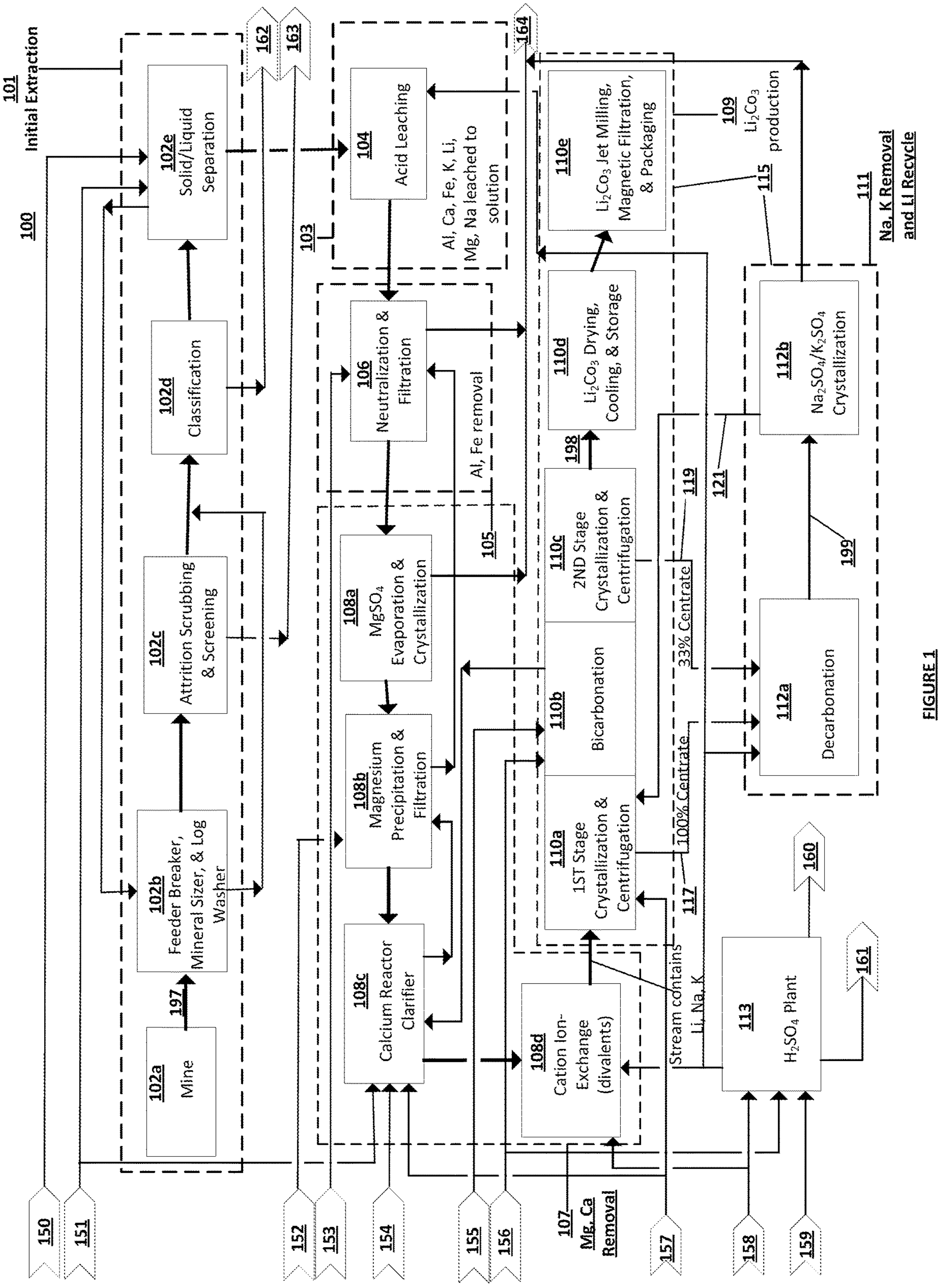
FIG. 1 is an overall process flow diagram of a lithium extraction process.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an improved lithium extraction process and associated methods, systems, devices, and various apparatus. The improved lithium extraction process can comprise a solvent extraction unit. It would be understood by one of skill in the art that the disclosed improved lithium extraction process is described in but a few exemplary aspects among many. No particular terminology or description should be considered limiting on the disclosure or the scope of any claims issuing therefrom.

Figure 2:
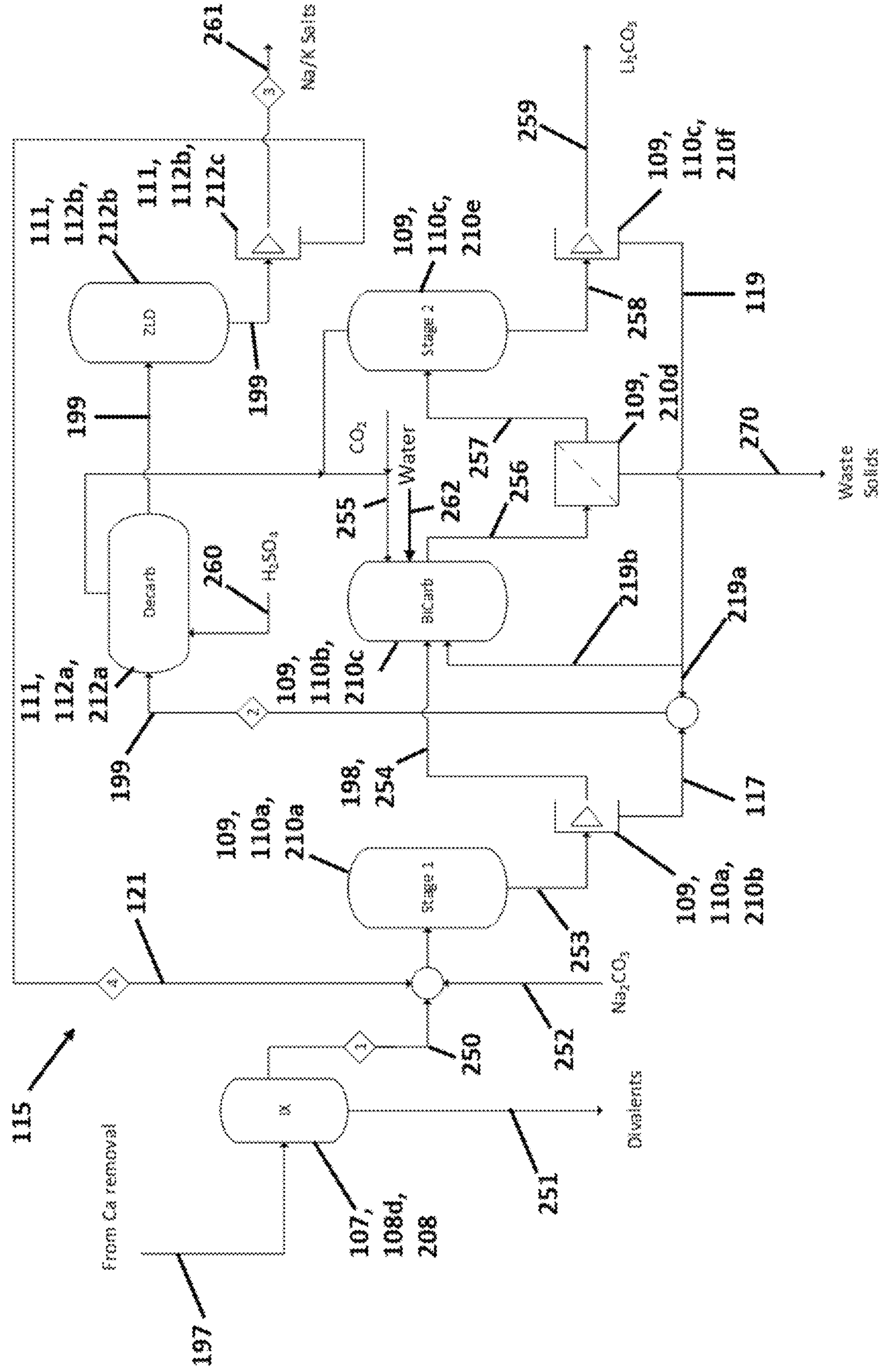
FIG. 2 is a detailed process diagram of a production circuit of the lithium extraction process of FIG. 1.
Figure 4:
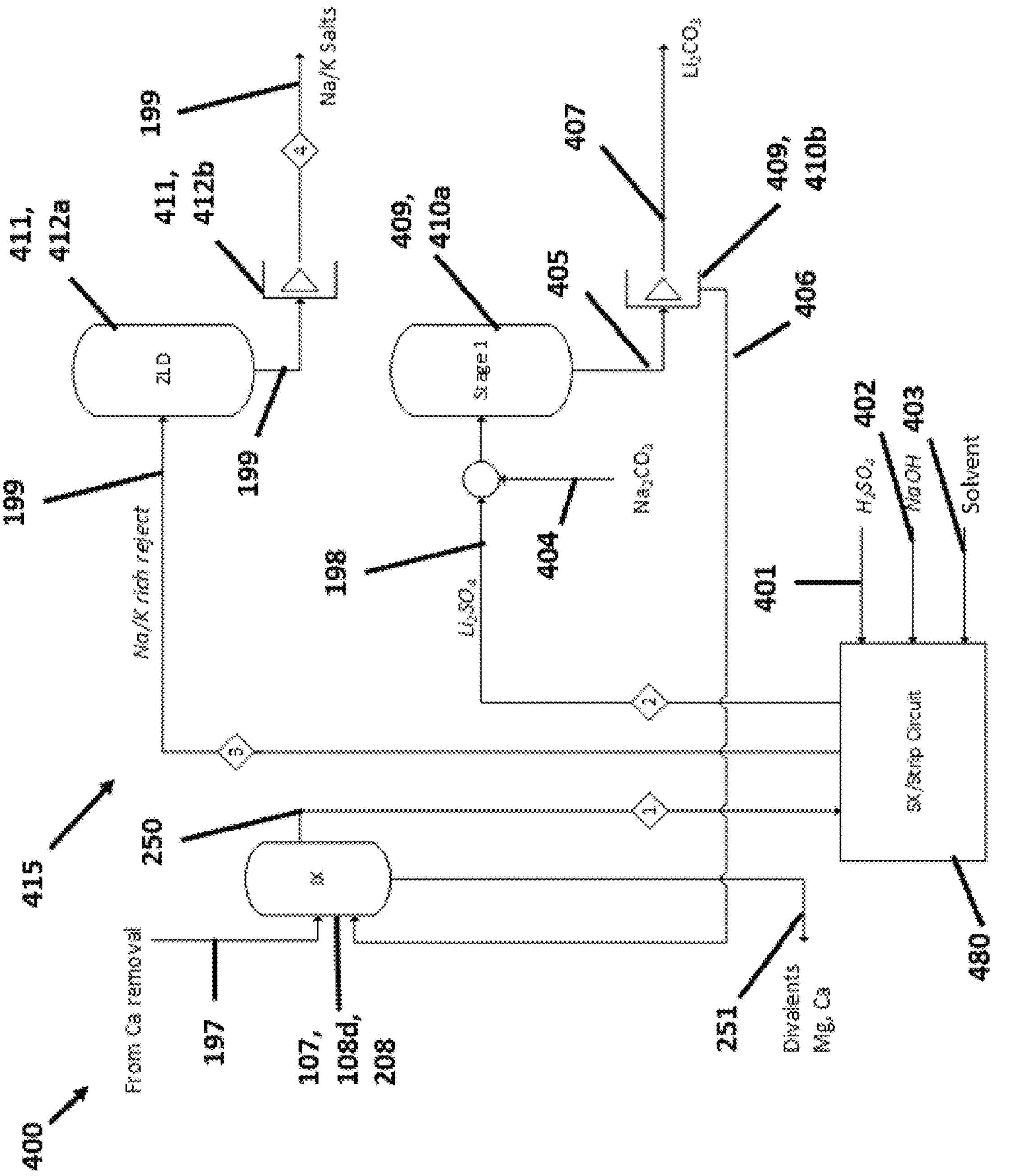
FIG. 4 is a detailed process diagram of an improved production circuit of an improved lithium extraction process in accordance with one aspect of the present disclosure.
Figure 5:
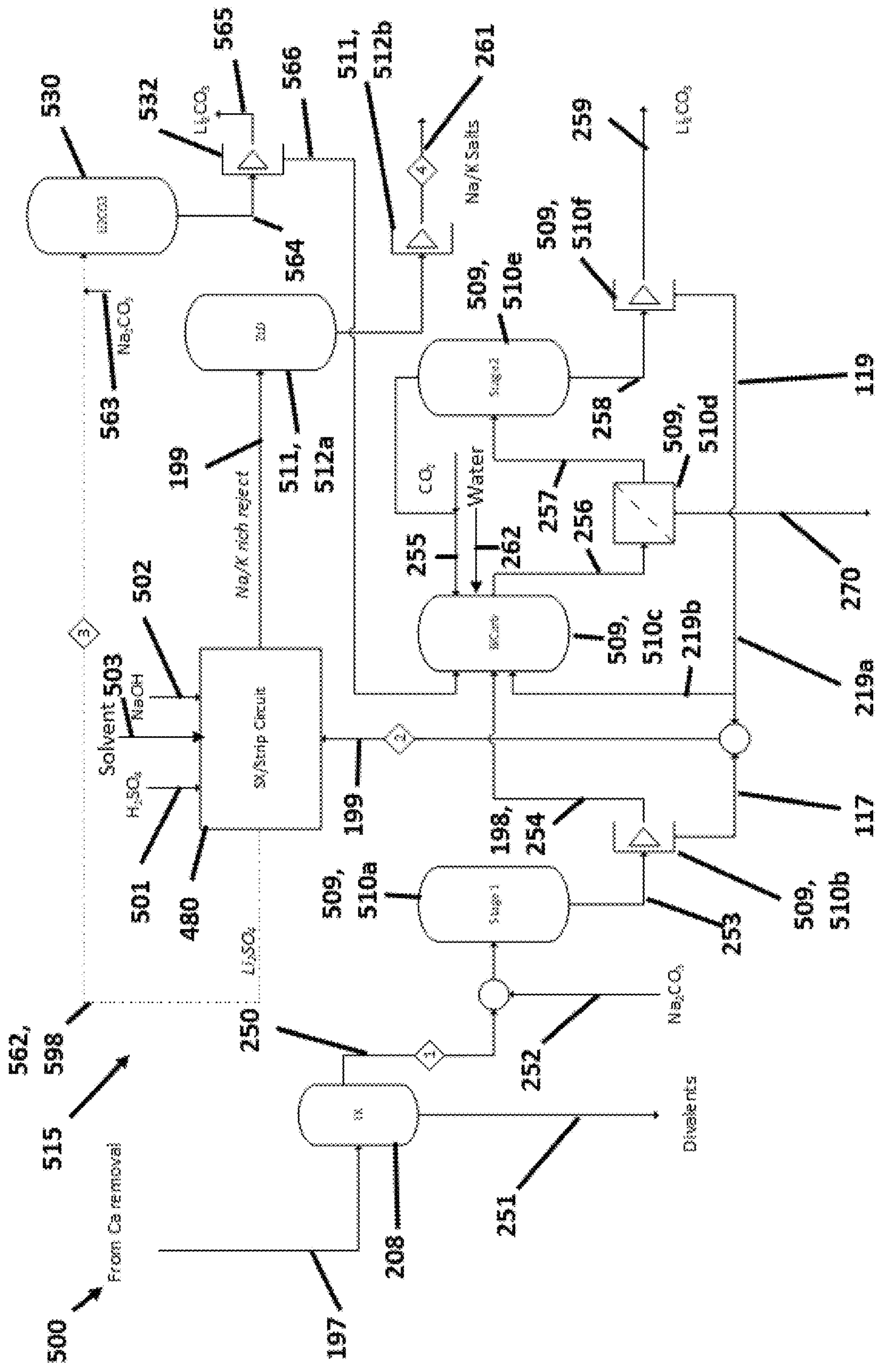
FIG. 5 is a detailed process diagram of an improved production circuit of an improved lithium extraction process in accordance with another aspect of the present disclosure.

FIG. 1 depicts a current overall lithium extraction process 100 (also referred to as the "current process 100"). Specifically, the current process 100 can be similar to that of the Thacker Pass lithium mine in Nevada, USA. FIG. 2 is a detailed process diagram of a production circuit 115 of the current process 100. By contrast, FIGS. 4 and 5 are detailed process diagrams of an improved lithium extraction process 400,500 showing two aspects of an improved production circuit 415,515, respectively, each comprising a solvent extraction unit 480 in accordance with various aspects of the present disclosure.

Turning to FIG. 1, the current process 100 can comprise multiple units 101,103,105, 107, 109, 111, 113, and a main processing stream 197 can carry lithium through units 101,103,105,107. The current process 100 can involve multiple input and output flow paths, as represented by elements 150-164, which can correspond to the following:

150: Raw water;
151: Flocculant;
152: Lime slurry;
153: Limestone;
154: Ferric sulfate;
155: Carbon dioxide;
156: Treated water;
157: Soda ash;
158: Caustic soda;
159: Molten sulfur;
160: Electricity;
161: Steam distribution;
162: Coarse gangue stockpile;
163: Waste rock storage facility; and
164: Clay tailings filter stack.

In the present aspect, the main processing stream 197 can initially be a feed of lithium-containing solids, such as a clay for example and without limitation. The current process 100 can comprise a beneficiation unit 101, a leaching unit 103, a filtration unit 105, a divalent removal unit 107, a lithium carbonate production unit 109, a waste-salt separation unit 111, and an acid production unit 113. After passing through the leaching unit 103, the main processing stream 197 can be an aqueous sulfate brine; however, this chemical composition should not be viewed as limiting. The main processing stream 197 can be split into a separate lithium-rich stream 198 and a waste-water stream 199. This division of the main processing stream 197 can occur in the lithium carbonate production unit 109.

The beneficiation unit 101 can comprise multiple steps 102*a-e*. In step 102*a*, the lithium-bearing deposit can be mined to extract lithium-bearing material. The initially extracted materials can comprise desired lithium ores as well as waste materials, such as gangue, waste rock, clays, etc. In steps 102*b-e*, the extracted material can be physically broken down (comminution), sorted by size, and initially separated, or concentrated, to isolate and extract the lithium ore from the associated waste materials. For example, in step 102*b*, the extracted material can be fed through a feeder breaker, mineral sizer, and log washer, which can crush the material to smaller particle sizes and remove unwanted materials, such as non-lithium-bearing minerals. In step 102*c*, the material can be further broken down with an attrition scrubber and preliminarily sized via screening. In step 102*c*, waste rock can be sorted out from the main processing stream 197. In step 102*d*, the remaining material can be classified, such as by size, which can remove the course gangue from the main processing stream 197. Finally, the material can be mixed with water and flocculants to produce a lithium stream of high solids concentration.

In the leaching unit 103, the lithium ore can be subjected to an acid leaching step 104, wherein the lithium ore can be mixed with an acid from the acid production unit 113, which can extract lithium from the ore into solution. The acid leaching step 104 can result in various elements, such as aluminum, calcium, iron, potassium, lithium, magnesium, and sodium, for example and without limitation, being leached into solution. In the present example, the acid production unit 113 can generate sulfuric acid ($H_2SO_4$); however, a different acid can be utilized.

Following the leaching unit 103, the limestone can be fed into the main processing stream 197 in the filtration unit 105, wherein a neutralization and filtration step 106 can remove the aluminum and iron from the main processing stream 197.

The divalent removal unit 107 can remove magnesium and calcium from the main processing stream 197 through a variety of steps 108*a-d*. In step 108*a*, magnesium can be removed through evaporation and crystallization, such as in the form of magnesium sulfate ($MgSO_4$). In step 108*b*, quicklime slurry can be added to the main processing stream 197 to further remove magnesium via precipitation and filtration of the magnesium precipitates. In step 108*c*, a flocculant, ferric sulfate, and soda ash solution ($Na_2CO_3$, also known as "sodium carbonate") can be added to the main processing stream 197, and calcium can be removed with a reactor clarifier. In step 108*d*, remaining divalent ions can be removed with a chelating ion-exchanger. For example, a regeneratable resin can be utilized to extract the divalent ions from aqueous solution. The resin can be regenerated as needed with acid (such as sulfuric acid, for example and without limitation, from the acid production unit 113) and/or alkali/soluble base (such as sodium hydroxide, for example and without limitation) injected into the ion exchanger, which can release the divalent ions into an aqueous waste stream.

From the divalent removal unit 107, the main processing stream 197 can flow to the production circuit 115, which can comprise the lithium carbonate production unit 109 and the waste-salt separation unit 111.

The lithium carbonate production unit 109 can comprise multiple steps 110*a-e*. Steps 110*a-c* pertain to the production of the lithium carbonate compound, and here, the main processing stream 197 can be separated into the lithium-rich stream 198 and the waste-water stream 199. Step 110*a* is the first stage of lithium carbonate crystallization and centrifugation. In this stage, soda ash can be added to the main processing stream 197. The centrifugation can separate the solids from the liquid centrate. In this step, about 100% of the centrate can be directed to the waste-salt separation unit 111, discussed below, as shown by a flow path 117, which becomes part of the waste-water stream 199.

The lithium-rich stream 198 can carry solids from step 110*a* to a bicarbonation process in step 110*b*, wherein the lithium-rich stream 198 can be combined, or re-slurried, with treated water and intermixed with carbon dioxide. The lithium-rich stream 198 can then undergo a second stage of lithium carbonate crystallization and centrifugation, wherein the solid lithium carbonate can be separated in part from the liquid centrate. In step 110*c*, about 33% of the centrate can join the waste-water stream 199 directed to the waste-salt separation unit 111, as shown by a flow path 119. The remaining liquid and lithium carbonate solids of the lithium-rich stream 198 can be dried to remove the remaining water, cooled, and then stored in step 110*d*. The lithium carbonate can then be jet milled, magnetic filtered, and packaged in step 110*e* to produce the final salable product.

As noted above, the waste-salt separation unit 111 can receive centrate from steps 110*a,c* of the lithium carbonate production unit 109, which can form the waste-water stream 199. The waste-water stream 199 can have high concentrations of sodium and potassium; however, the waste-water stream 199 can also carry a portion of the desired lithium. The sodium and potassium must be removed from the main processing stream 197 to produce battery quality lithium product from the lithium carbonate production unit 109; however, the steps 110*a-c* can also result in undesirable removal of lithium from the main processing stream 197 to the waste-water stream 199.

In a step 112*a* of the waste-salt separation unit 111, the centrate can be treated with acid, such as sulfuric acid for example and without limitation, from the acid production unit 113, to decarbonate the centrate. Once decarbonated, the waste-water stream 199 can pass to a step 112*b* of the waste-salt separation unit 111, wherein the waste-water stream 199 can undergo a separation process, such as crystallization, evaporation, centrifugation, etc. The separation process can be a zero-liquid-process, which can yield solid sodium sulfate and potassium sulfate salts (and inadvertently, lithium sulfate salts). These salts can be separated for storage and/or removal from the mine.

As discussed in greater detail below with respect to a ternary phase diagram for sulfates of sodium, potassium, and lithium, shown in FIG. 3, the waste-water stream 199 cannot undergo complete separation without forming lithium-containing salts, such as lithium potassium sulfate, in addition to sodium and potassium sulfate salts, which results in a loss of this portion of the lithium for commercially practical purposes. The waste-water stream 199 can carry as much as 15-30% or more of the lithium in the current process 100; therefore, if all solids were completely separated from the waste-water stream 199, it would significantly reduce the recovery of the current process 100, which in turn would result in a large detrimental effect to the profitability of the current process 100 due to the loss of lithium with the waste salts.

To avoid this loss of lithium, the crystallizer of step 112*b* can only perform partial separation of waste salts from the waste-water stream 199. Because the concentrations of sodium and potassium are much higher than the concentration of lithium in the waste-water stream 199, this partial separation only results in the production of sodium and potassium sulfate salts. The remaining liquid of the waste-water stream 199 (carrying the lithium portion and remaining sodium and potassium) can be sent back to step 110*a* of the lithium carbonate production unit 109 by a recycle loop 121.

The recycle loop 121 can be a substantial portion of the volume flow rate of the main processing stream 197. Recycling this volume through steps 110*a-c* of the lithium carbonate production unit 109 can increase the percentage of the lithium recovered by the current process 100, but at the expense of increased energy and reagent consumption, such as for soda ash and sulfuric acid. Recycling this volume always requires the equipment to be sized larger than would otherwise be necessary to accommodate larger flow rates.

FIG. 2 is a detailed view showing the production circuit 115 of the current process 100 of FIG. 1. Beginning on the left side of the page, the main processing stream 197 is shown passing through an ion exchange vessel 208 in the step 108*d* of the divalent removal unit 107. The ion exchange vessel 208 can strip the remaining calcium and magnesium divalent ions ($Ca^{2+}$ and $Mg^{2+}$, respectively) from the main processing stream 197, such as with the use of a regenerable ion exchange resin or other suitable medium, for example and without limitation. When the exchange medium is regenerated, the calcium and magnesium divalent ions can be removed from the ion exchange vessel 208, as demonstrated by a flow path 251.

The main processing stream 197, now stripped of divalent ions, can exit the ion exchange vessel 208 along a flow path 250, where the main processing stream 197 can be intermixed with soda ash, as demonstrated by a flow path 252, and the recycle loop 121 from the waste-salt separation unit 111. As similarly discussed above, the recycle loop 121 can return lithium ions and the remaining sodium and potassium ions that were not crystallized in the waste-salt separation unit 111. Notably, the soda ash can add additional sodium to the main processing stream 197.

The main processing stream 197 can then enter a first crystallizer 210*a* of the step 110*a* of the lithium carbonate production unit 109. The first crystallizer 210*a* can be a precipitator in some aspects. Here, the lithium cations ($Li^+$) can react with the carbonate anions ($CO_3^{2-}$) from the soda ash to form lithium carbonate crystals. The main processing stream 197 can proceed along a flow path 253 from the first crystallizer 210*a* to a centrifugal separator 210*b* of the step 110*a* of the lithium carbonate production unit 109. The centrifugal separator 210*b* can separate the solid lithium carbonate crystals from the liquid of the main processing stream 197. The lithium carbonate carried by the lithium-rich stream 198 can proceed along a flow path 254 to a bicarbonation vessel 210*c* of the step 110*b* of the lithium carbonate production unit 109.

The centrate from the centrifugal separator 210*b* can be directed along the flow path 117, where it can combine with a first portion 219*a* of the centrate discharged from a centrifugal separator 210*f* of the step 110*c* of the lithium carbonate production unit 109 along the flow path 119. Together, these streams can form the waste-water stream 199 that can be directed to the waste-salt separation unit 111, discussed in further detail below.

Returning to the bicarbonation vessel 210*c*, the lithium-rich stream 198 from the first crystallizer 210*a* can be rinsed with a second portion 219*b* of the centrate from the centrifugal separator 210*f* while carbon dioxide ($CO_2$) can be injected into the bicarbonation vessel 210*c* along a flow path 255. Treated water can also be injected into the bicarbonation vessel 210*c* along a flow path 262. These steps can cause lithium carbonate solids to dissolve into solution as lithium bicarbonate ($LiHCO_3$).

The lithium-rich stream 198 can proceed along a flow path 256 from the bicarbonation vessel 210*c* to a filter 210*d* of the lithium carbonate production unit 109, wherein waste solids and solid contaminants can be separated out from the lithium-rich stream 198 along a flow path 270. The lithium-rich stream 198 can flow along a flow path 257 to a second crystallizer 210*e* of the step 110*c* of the lithium carbonate production unit 109, where the dissolved lithium bicarbonate can be converted back to solid lithium carbonate crystals. In the present aspect, crystallization can be achieved through a precipitation process, such as a chemical crystallization process. In some aspects, crystallization can be achieved through a traditional crystallization process. By heating the lithium-rich stream 198, carbon dioxide can be removed, which can be recycled through the bicarbonation vessel 210*c* along the flow path 255. The bicarbonation and second crystallization steps can be required to achieve sufficient purity to produce battery-quality lithium carbonate.

The lithium-rich stream 198 can then flow along a flow path 258 to the centrifugal separator 210*f* of the step 110*c* of the lithium carbonate production unit 109, where the solid lithium carbonate crystals can be separated from the liquid as centrate. The lithium-rich stream 198, carrying the solid lithium carbonate, can proceed along a flow path 259 to be dried, sized, filtered, and packaged for sale (amongst other steps) as described above with respect to steps 110*d, e* of the production unit 109 in FIG. 1. As similarly noted above, the centrate can be directed along the flow path 119 where the first portion 219*a* of the centrate can be directed to the waste-salt separation unit 111, and the second portion 219*b* can be directed to the bicarbonation vessel 210*c*.

The waste-water stream 199 can be a sulfate and carbonate brine containing large concentrations of sodium and potassium cations and a lesser concentration of lithium cations, amongst other aqueous ions. The waste-water stream 199 can pass through a decarbonation vessel 212*a* of the step 112*a* of the waste-salt separation unit 111. Here, an acid, such as sulfuric acid, can be injected into the decarbonation vessel 212*a* along a flow path 260, where the acid can react with the waste-water stream 199 to destroy all remaining carbonate anions (from the soda ash injected along flow path 252) and liberate carbon dioxide gas. This carbon dioxide gas can be collected and directed to the bicarbonation vessel 210*c* along the flow path 255. The addition of sulfuric acid to the waste-water stream 199 can lower the pH of the waste-water stream 199 and increase the concentration of sulfate anions in the chemical composition of the waste-water stream 199.

The waste-water stream 199 can then flow to a waste-salt separation unit, such as a zero-liquid-discharge ("ZLD") unit 212*b* of the step 112*b* of the waste-salt separation unit 111. The aforementioned removal of remaining carbonate in step 112*a* can prevent the loss of lithium carbonate in the ZLD unit 212*b*. Referring to FIG. 3, a ternary phase diagram for lithium, sodium, and potassium cations in the presence of sulfate anions is shown. The ternary phase diagram indicates which salts will be produced when an aqueous solution is subjected to a separation process (e.g. crystallization, centrifugation, evaporation, etc.) over a full spectrum of chemistries of lithium, sodium, and potassium cations and sulfate anions.

Specifically, the ternary phase diagram defines three corners 300*a,b,c* and three sides 301*a,b,c*, each corresponding to the relative concentration ratios of lithium, sodium, and potassium sulfates, respectively. The relative concentration values of lithium, sodium, and potassium equal 100% when added together. The corners 300*a,b,c* respectively reflect 100% lithium sulfate, 100% sodium sulfate, and 100% potassium sulfate. For example, the corner 300*a* indicates that no sodium or potassium cations are present, only lithium cations (notably, the diagram is shown on a dry basis and omits the water in solution).

The sides 301*a,b,c* opposite from these points reflect an absence of that respective cation. For example, points along the side 301*a*, which is opposite from corner 300*a*, represent an absence of lithium cations (i.e. only sodium and potassium cations are present in the chemical composition). Similarly, points along the side 301*b* represent an absence of sodium cations, and points along the side 301*c* represent an absence of potassium cations.

The ternary diagram for lithium, sodium, and potassium sulfates has six regions A-F, which each signify the types of salts that will be formed when a solution with a particular ratio of lithium, sodium, and potassium concentrations undergoes a separation process.

For example, a solution with ratios of lithium, sodium, and potassium falling into region A will initially yield $Na_2SO_4 \cdot Li_2SO_4$, which is a lithium-containing double salt. Region A generally corresponds to solutions with little or no potassium, and lithium and sodium present in similar concentrations.

A solution falling into region B will initially yield $Na_2SO_4$, which is a single salt devoid of lithium. Region B generally corresponds to solutions with a very high sodium concentration, and little or no lithium and potassium present.

A solution falling into region C will initially yield $LiKSO_4$, which is a lithium-containing double salt that also contains potassium. Region C generally corresponds to solutions with moderate, low, or no sodium, and lithium and potassium present in similar concentrations.

A solution falling into region D will initially yield $Li_2SO_4 \cdot H_2O$, which is a lithium-containing hydrated salt. Region D generally corresponds to solutions with a very high lithium concentration, and little or no sodium and potassium present.

A solution falling into region E will initially yield $K_2SO_4 \cdot KNaSO_4$, which is a double salt devoid of lithium. Region E generally corresponds to solutions with little or no lithium, and potassium and sodium present in similar concentrations.

A solution falling into region F will initially yield $K_2SO_4$, which is a single salt devoid of lithium. Region F generally corresponds to solutions with a very high potassium concentration, and little or no sodium and lithium present.

A solution falling into region G will initially yield $2Li_2SO_4 \cdot Na_2SO_4 \cdot K_2SO_4$, which is a lithium-containing triple salt. Region G generally corresponds to solutions with moderate-to-low levels of potassium, and lithium and potassium present in a relatively wide range of concentrations.

As previously noted, the initial chemical composition of the waste-water stream 199 (shown in FIG. 1) generally contains high levels of sodium and potassium and relatively low levels of lithium. For example, the concentrations of sodium and potassium in ppm can each be roughly 5-10 times (5-10×) the concentration of lithium in ppm. In one exemplary chemical composition, the ratio of sodium to potassium can be roughly 5:4. Accordingly, the initial chemical composition of the waste-water stream 199 can generally fall into one of regions B, E, or F at the outset of the separation process. A series of boundary lines 302*a-g* surround regions B, E, and F. Boundary lines 302*h,i* lie between regions A, C, and G. Note that other boundary lines are shown but not labelled.

As the separation process progresses, the concentrations of lithium, potassium, and sodium increase as solvent (water) is removed until the aforementioned salt crystals begin to form and drop out of solution. To use region B as an example, an initial chemical composition at the outset of the separation process that falls within the interior of region B will initially yield solid $Na_2SO_4$ crystals. The formation of these sodium salts has the effect of reducing the ratio of sodium in the waste-water stream 199, which in turn increases the ratio of lithium and potassium in the waste-water stream 199. Accordingly, the concentration of the waste-water stream 199 will move in a direction towards side 301*b* as $Na_2SO_4$ crystals form until the concentration reaches one of the boundary lines 302*a-c* that border region B.

Once the concentration reaches a ratio lying along one of the boundary lines 302*a-c*, the concentration will never cross the boundary line 302*a-c* as the separation process continues. This is because continued separation yields the salts corresponding to each region bordered by that boundary line 302*a-c*.

For example, if the concentration shifts to lie along boundary line 302*a*, continued separation will yield $Na_2SO_4$ crystals, as represented by Region B, and $Na_2SO_4 \cdot Li_2SO_4$ double-salt crystals, as represented by region A on the opposite side of the boundary line 302*a*. Similarly, if the concentration shifts to lie along boundary line 302*b*, continued separation will yield $Na_2SO_4$ crystals, as represented by Region B, and $2Li_2SO_4 \cdot Na_2SO_4 \cdot K_2SO_4$ triple-salt crystals, as represented by region G on the opposite side of the boundary line 302*b*. If the concentration shifts to lie along boundary line 302*c*, continued separation will yield $Na_2SO_4$ crystals, as represented by Region B, and $K_2SO_4 \cdot KNaSO_4$ double-salt crystals, as represented by region E on the opposite side of the boundary line 302*c*.

Once the concentration lies along a boundary line, continued separation will result in the concentration shifting along that respective boundary line until final equilibrium is reached at a ternary point 303*a-d*. Note, only the ternary points 303*a-d* have been labelled because these points border one of regions B, E, and F. The ternary points 303*a-d* each lie at the intersection of three boundary lines. The ternary point 303*a* lies at the intersection of boundary lines 302*a,b,i*. The ternary point 303*b* lies at the intersection of boundary lines 302*b,c,d*. The ternary point 303*c* lies at the intersection of boundary lines 302*d,e,h*. The ternary point 303*d* lies at the intersection of boundary lines 302*e,f,g*.

Initial chemical compositions for the waste-water stream 199 lying in region B will always reach final equilibrium at either ternary point 303*a* or ternary point 303*b*, depending on the ratio of potassium to lithium present. Initial chemical compositions for the waste-water stream 199 lying in region E will always reach final equilibrium at either ternary point 303*b*, ternary point 303*c*, or ternary point 303*d*, depending on the ratio of potassium to sodium present. Initial chemistries for the waste-water stream 199 lying in region F will always reach final equilibrium at ternary point 303*d*.

Once the concentration reaches final equilibrium at a ternary point 303*a-d*, continued separation will yield solid salt crystals corresponding to each adjacent region to that ternary point 303*a-d* until complete separation is achieved. For example, continuing the separation process at the ternary point 303*a* will yield the salts of regions A,B,G, and notably, regions A and G result in the production of lithium-containing double and triple salts, respectively. Continuing the separation process at the ternary point 303*b* will yield the salts of regions B,E,G, and notably, region G results in the production of lithium-containing triple salts. Continuing the separation process at the ternary point 303*c* will yield the salts of regions C,E,G, and notably, region G results in the production of lithium-containing triple salts while region C results in a single salt containing both lithium and potassium. Continuing the separation process at the ternary point 303*a* will yield the salts of regions C,E,F, and notably, region C results in a single salt containing both lithium and potassium.

The salts corresponding to regions A, C, and G each contain lithium and are not commercially viable products. Lithium produced in these forms is effectively lost for practical commercial purposes. Accordingly, in typical operation of the current process 100, the waste-water stream 199 generally exhibits an initial chemical composition lying within region B, region E, or region F, and the waste-water stream 199 can only undergo a partial separation process to produce $Na_2SO_4$, $K_2SO_4{\cdot}KNaSO_4$, and/or $K_2SO_4$ waste salts without producing any lithium-containing salts. In other words, the separation process can only progress to the extent that the chemical composition has not yet reached any of the boundary lines 302*a-g* or the ternary points 303*a-d* to avoid losing lithium. A substantial amount of solvent (water) can remain at this process-imposed separation limit.

Returning to FIG. 2, the partially treated waste-water stream 199 can pass from the ZLD unit 212*b* to a centrifugal separator 212*c*, wherein the solids, such as the sodium and potassium salts, can be separated from the remaining liquid. These sodium and potassium waste salts can follow flow path 261, where they can be stored with other waste products, such as clay tailings, while the remaining liquid of the waste-water stream 199 (still carrying substantial concentrations of sodium, lithium, and potassium) can be directed along the recycle loop 121. The recycle loop 121 can rejoin the main processing stream 197, and the recycled stream can be re-processed by at least a portion of the lithium carbonate production unit 109, which can result in an undesired increase of sodium and potassium in the main processing stream 197.

FIGS. 4 and 5 depict various aspects of the improved production circuit 415,515, respectively, comprising the solvent extraction unit 480 in accordance with various aspects of the present disclosure.

Beginning with FIG. 4, the improved production circuit 415 of the improved lithium extraction process 400 is shown following the ion exchange vessel 208 in the step 108*d* of the divalent removal unit 107. In some aspects, the portion of the improved lithium extraction process 400 that is upstream from the ion exchange vessel 208 can be substantially the same as for the current lithium extraction process 100 (shown in FIG. 1); however, the improved production circuit 415 can be integrated into any lithium extraction process. As similarly discussed above, the ion exchange vessel 208 can strip the remaining calcium and magnesium ions from the main processing stream 197, such as with the use of a regenerable ion exchange resin or other suitable medium, for example and without limitation. When the exchange medium is regenerated, the calcium and magnesium divalent ions can be removed from the ion exchange vessel 208, as demonstrated by the flow path 251. The main processing stream 197, now stripped of divalent ions, can exit the ion exchange vessel 208 along the flow path 250.

In the present aspect, the ion exchange vessel 208 can also receive a recycle loop 406 from a lithium carbonate production unit 409 of the improved production circuit 415, which can rejoin the main processing stream 197.

In the aspect of FIG. 4, the main processing stream 197 can pass through the solvent extraction unit 480, as shown by the flow path 250. The solvent extraction unit 480 is shown and discussed in greater detail below with respect to FIG. 6. The solvent extraction unit 480 can utilize numerous reagents. For example, the solvent extraction unit 480 can receive an acid, such as sulfuric acid for example and without limitation, along a flow path 401. The solvent extraction unit 480 can receive an alkali, such as sodium hydroxide (NaOH) for example and without limitation, along a flow path 402. The solvent extraction unit 480 can receive one or more organic solvents, each comprising one or more extractant(s), diluent(s), or combinations thereof, for example and without limitation, along a flow path 403. In some aspects utilizing multiple extractants, the flow path 403 can carry the intermixed extractants and one or more diluents. In some aspects utilizing multiple extractants, the flow path 403 can represent multiple separate paths for the separate extractants, which may or may not be intermixed within the solvent extraction unit 480.

Two-separate streams can emerge from the solvent extraction unit 480: the waste-water stream 199 and the lithium-rich stream 198. The waste-water stream 199 and the lithium-rich stream 198 can each be aqueous streams. The solvent extraction unit 480 can selectively extract 99% or more of the lithium from the main processing stream 197 while only a few percent of the sodium and potassium can be extracted with the lithium, thereby leaving the majority of the sodium and potassium remaining in the main processing stream 197. For example and without limitation, in some aspects, 2% or less of the sodium and/or potassium can be extracted with the lithium in the solvent extraction unit 480. The extracted lithium can then be concentrated into the lithium-rich stream 198. When optimized, as discussed in greater detail below, the solvent extraction unit 480 can concentrate roughly 100% of the lithium from the main processing stream 197 into the lithium-rich stream.

With virtually all of the lithium extracted from the main processing stream 197 but substantial concentrations of sodium and potassium remaining, the main processing stream 197 can become the waste-water stream 199 exiting the solvent extraction unit 480. The waste-water stream 199 can contain less than 1% of the lithium from the main processing stream 197. When optimized, the solvent extraction unit 480 can produce a waste-water stream 199 comprising less than 0.1% of the lithium from the main processing stream 197.

Because of the waste-water stream 199 can comprise little to no lithium, a separation process of the waste-water stream 199, beginning immediately downstream of the solvent extraction unit 480 and extending to achievement of complete separation, or removal, of all waste salts, can be a linear process. "Linear process" means a process lacking any recycle loop (such as the recycle loop 121). For example, the entire waste-water stream 199 can be directed through a waste-salt separation unit 411 of the improved production circuit 415 to achieve substantially complete separation of waste salts in a linear process, without recycling any of the waste-water stream 199.

In the present aspect, the waste-salt separation unit 411 can comprise the ZLD unit 412*a* and the centrifugal separator 412*b*. The waste-salt separation unit 411 can remove substantially all of the liquid from the waste-water stream 199, leaving behind only waste salts, such as various potassium and sodium salts, that are devoid of lithium. For example, in some aspects, less than 0.5% of the lithium from the main processing stream 197 can be produced in the waste salts. In some more preferred aspects, 0.2% or less of the lithium from the main processing stream 197 can be produced in the waste salts. Referring to the ternary phase diagram of FIG. 3, the chemical composition of the waste-water stream 199 entering the waste-salt separation unit 411 can fall along or immediately adjacent to the side 301*a*, denoting 0% lithium concentration, in region B, E, or F.

Returning to FIG. 4, the lithium-rich stream 198 can be intermixed with soda ash, as shown by a flow path 404. The lithium-rich stream 198 can enter a crystallizer 410*a* of the lithium carbonate production unit 409, where lithium carbonate crystals can be formed. As shown by a flow path 405, the lithium-rich stream 198 can pass from the crystallizer 410*a* to a centrifugal separator 410*b*, wherein the lithium carbonate can be separated from the liquid of the lithium-rich stream 198. This separation can remove much of the sodium added by the soda ash from the lithium-rich stream 198 as centrate. The centrate can be returned to the ion exchange vessel 208 along the recycle loop 406. The lithium carbonate of the lithium-rich stream 198 can exit the centrifugal separator 410*b* along a flow path 407.

In some aspects of the improved production circuit 415, the lithium-rich stream 198 from the centrifugal separator 410*b* can be directly prepared for sale, such as by being dried, cooled, stored, jet milled, magnetic filtered, and/or packaged, as similarly discussed with respect to steps 110*d, e* of the lithium carbonate production unit 109 (steps 110*d,e* and lithium carbonate production unit 109 shown in FIG. 1). In some aspects of the improved production circuit 415, the lithium-rich stream 198 can pass from the centrifugal separator 410*b* to additional processing equipment before being prepared for sale. For example and without limitation, the lithium-rich stream 198 can pass through a bicarbonation vessel, a filter, a second crystallizer, and/or a second centrifugal separator, as similarly shown by the lithium carbonate production unit 109 of FIG. 1.

FIG. 5 shows the improved production circuit 515 of the improved lithium extraction process 500, which can comprise the solvent extraction unit 480 in accordance with another aspect of the present disclosure. The improved production circuit 515 is shown following the ion exchange vessel 208 in the step 108*d* of the divalent removal unit 107. The portion of the improved lithium extraction process 500 that is upstream from the ion exchange vessel 208 can be substantially the same as for the current lithium extraction process 100 (shown in FIG. 1); however, the improved production circuit 415 can be integrated into any lithium extraction process. As similarly discussed above, the ion exchange vessel 208 can strip the remaining calcium and magnesium ions from the main processing stream 197, such as with the use of a regenerable ion exchange resin or other suitable medium, for example and without limitation.

When the exchange medium is regenerated, the calcium and magnesium divalent ions can be removed from the ion exchange vessel 208, as demonstrated by the flow path 251. The main processing stream 197, now stripped of divalent ions, can exit the ion exchange vessel 208 along the flow path 250, where the main processing stream 197 can be intermixed with soda ash, as demonstrated by the flow path 252.

Instead of the waste-water stream 199 flowing directly to a waste-salt separation unit 511 in the aspect of FIG. 5, the solvent extraction unit 480 can be integrated to receive the waste-water stream 199 prior to entering the waste-salt separation unit 511.

Returning to the main processing stream 197, after exiting the ion exchange vessel 208 along the flow path 250, the main processing stream 197 can then enter a first crystallizer 510*a* of a lithium carbonate production unit 509. The lithium carbonate production unit 509 of the improved production circuit 515 can be similar to the lithium carbonate production unit 109 of the current process 100 of FIG. 1. In the first crystallizer 510*a*, the lithium cations can react with the carbonate anions ($CO_3^{2-}$) from the soda ash to form lithium carbonate crystals. The main processing stream 197 can proceed along the flow path 253 from the first crystallizer 510*a* to a centrifugal separator 510*b* of the lithium carbonate production unit 509. The centrifugal separator 510*b* can separate the solid lithium carbonate crystals from the liquid of the main processing stream 197 as centrate. The lithium carbonate crystals of the lithium-rich stream 198 can proceed along the flow path 254 to a bicarbonation vessel 510*c* of the lithium carbonate production unit 509.

The centrate from the centrifugal separator 510*b* can be directed along the flow path 117, where it can combine with the first portion 219*a* of the liquid, or centrate, discharged from a centrifugal separator 510*f* of the lithium carbonate production unit 509 along the flow path 119. Together, these streams can comprise the waste-water stream 199 that can be directed to the solvent extraction unit 480, discussed in further detail below.

Returning to the bicarbonation vessel 510*c*, the lithium-rich stream 198 from the first crystallizer 510*a* can be rinsed with the second portion 219*b* of the centrate from the centrifugal separator 510*f* while carbon dioxide can be injected into the bicarbonation vessel 510*c* along the flow path 255, and treated (deionized) water can be injected into the bicarbonation vessel 510*c* along the flow path 262. These steps can cause formation of soluble lithium bicarbonate from the lithium carbonate crystals reacting with the carbon dioxide.

The lithium-rich stream 198 can proceed along the flow path 256 from the bicarbonation vessel 510*c* to a filter 510*d* of the lithium carbonate production unit 509, wherein waste solids can be separated out from the lithium-rich stream 198 along the flow path 270. The lithium-rich stream 198 can travel along the flow path 257 to a second crystallizer 510*e* of the lithium carbonate production unit 509, where formation of lithium carbonate crystals can occur. This process can liberate carbon dioxide, which can be recycled to the bicarbonation vessel 510*c* along the flow path 255.

The lithium-rich stream 198 can then flow along a flow path 258 to the second centrifugal separator 510*f* of the lithium carbonate production unit 509, where the solid lithium carbonate crystals can be separated from the liquid as centrate. The lithium-rich stream 198, carrying the solid lithium carbonate crystals, can proceed along a flow path 259 to be dried, sized, filtered, and packaged for sale (amongst other steps) as described above with respect to steps 110*d,e* of the production unit 109 in FIG. 1. As similarly noted above, the centrate can be directed along the flow path 119 where the first portion 219*a* of the centrate can be directed to the solvent extraction unit 480, and the second portion 219*b* can be directed to the bicarbonation vessel 510*c*.

The waste-water stream 199 can contain large concentrations of sodium and potassium cations and a lesser concentration of lithium cations, amongst other aqueous ions. The waste-water stream 199 can enter the solvent extraction unit 480. The solvent extraction unit 480 can utilize numerous reagents. For example, the solvent extraction unit 480 can receive an acid, such as sulfuric acid for example and without limitation, along a flow path 501. The solvent extraction unit 480 can receive a caustic, or alkali, such as sodium hydroxide for example and without limitation, along a flow path 502. The solvent extraction unit 480 can receive one or more solvents along a flow path 503, such as one or more extractants, one or more diluents, or combinations thereof, for example and without limitation. In some aspects, the extractants can be reactive and can be dissolved in the diluent.

Two-separate streams can emerge from the solvent extraction unit 480: the waste-water stream 199 and a secondary lithium-rich stream 598. The waste-water stream 199 and the secondary lithium-rich stream 598 can each be aqueous streams. The solvent extraction unit 480 can selectively extract 99% or more of the lithium from the waste-water stream 199 while the majority of the sodium and potassium remain in the waste-water stream 199. The extracted lithium can then be concentrated into the secondary lithium-rich stream 598. When optimized, as discussed in greater detail below, the solvent extraction unit 480 can concentrate roughly 100% of the lithium from the waste-water stream 199 into the secondary lithium-rich stream 598.

With virtually all of the lithium extracted from the waste-water stream 199 but substantial concentrations of sodium and potassium remaining, the waste-water stream 199 can exit the solvent extraction unit 480 containing less than 1% of the lithium entering the solvent extraction unit 480 in the waste-water stream. In some aspects, 98% or more of the sodium and/or potassium can remain in the waste-water stream 199 while 0.5% or less of the lithium can remain in the waste-water stream 199, for example and without limitation. When optimized, the solvent extraction unit 480 can leave less than 0.1% of the lithium in the waste-water stream 199.

The waste-water stream 199 exiting the solvent extraction unit 480 can then flow to a ZLD unit 512*a* of a waste-salt separation unit 511 of the improved production circuit 515, and then to a centrifugal separator 512*b* of the waste-salt separation unit 511. In some aspects, a centrifuge, crystallizer, evaporator, or other type of separation equipment and/or a dryer can be used to completely separate waste salts from the waste-water stream 199. Notably, the waste-water stream 199 can be a linear process from immediately downstream of the solvent extraction unit 480 to complete separation of waste-salts from the waste-water stream 199, which is to say that the waste-water stream 199 can exclude a recycle loop (such as the recycle loop 121 of FIG. 1).

Figure 3:
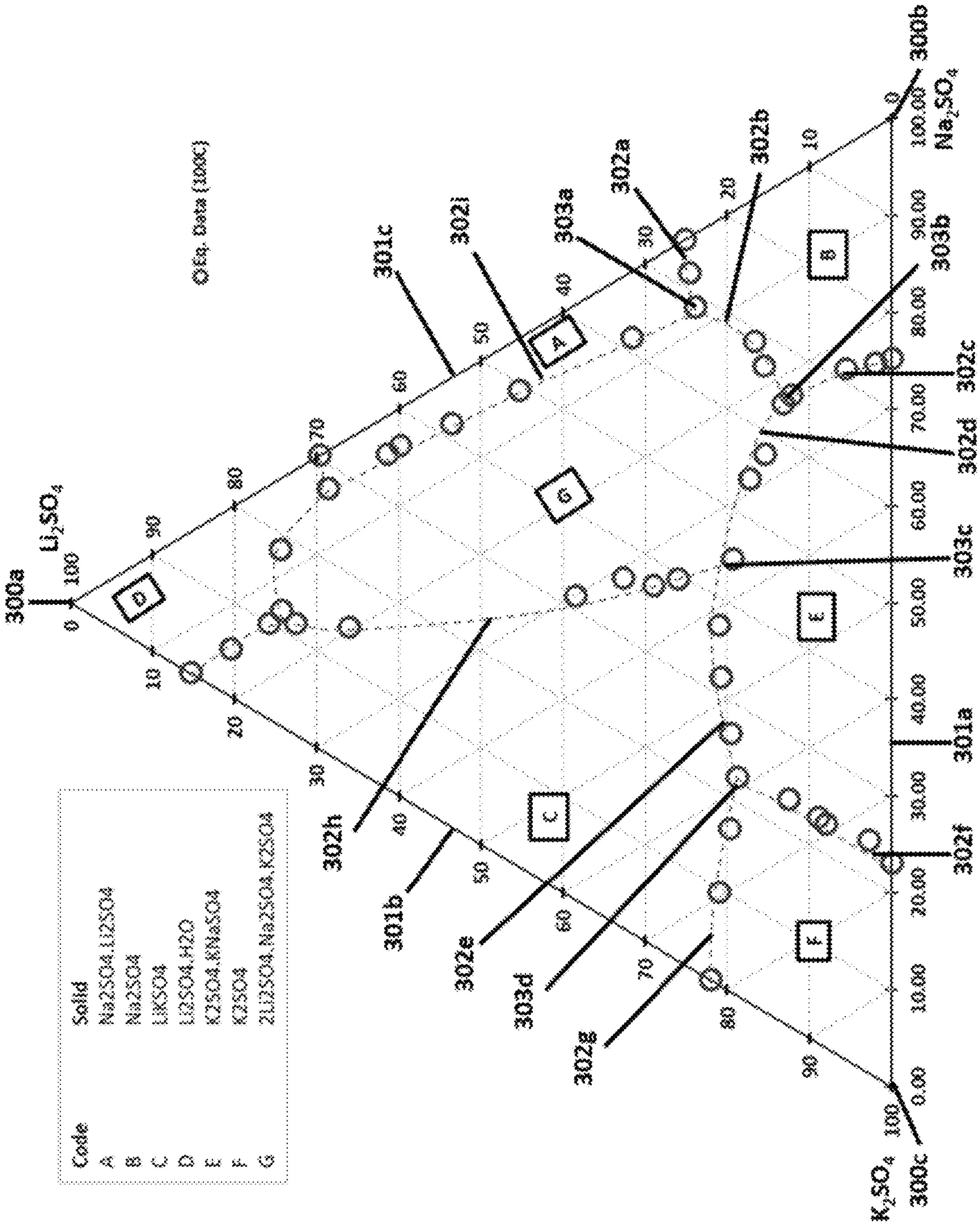
FIG. 3 is a ternary phase diagram for lithium, sodium, and potassium cations in the presence of sulfate anions.

With reference to the ternary phase diagram of FIG. 3, the chemical composition of the waste-water stream 199 entering the waste-salt separation unit 511 (after exiting the solvent extraction unit 480) can fall along or immediately adjacent to the side 301*a*, denoting 0% lithium concentration, in region B, E, or F. Accordingly, the waste-salt separation unit 511 can completely separate waste salts from the waste-water stream 199 while losing no more than trace amounts (such as less than 0.5%) of lithium in the form of lithium sulfate salts. The resulting waste salts, such a sodium and potassium sulfate salts, can follow flow path 261, where they can be stored with other waste products, such as clay tailings.

In the present aspect, the secondary lithium-rich stream 598 can follow a flow path 562 to a secondary crystallizer 530. Soda ash can be intermixed with the secondary lithium-rich stream 598, as shown by a flow path 563. The lithium of the secondary lithium-rich stream 598 and the soda ash can react within the secondary crystallizer 530 to form lithium carbonate crystals. The secondary lithium-rich stream 598 can exit the secondary crystallizer 530 and pass to a secondary centrifugal separator 532 along a flow path 564. The secondary centrifugal separator 532 can separate the lithium carbonate crystals from the liquid, or centrate. During the centrifugation stages, the lithium carbonate crystals can be washed to further remove contaminants. The lithium carbonate crystals can follow a flow path 565 to be prepared for sale, as similarly described above with respect to steps 110*d,e* of the carbonate production unit 109 of the current lithium extraction process 100 (shown in FIG. 1).

The centrate can follow a flow path 566 to the lithium carbonate production unit 509. The centrate can carry the majority of the sodium added by the soda ash. In the present aspect, the flow path 566 can lead the centrate to the bicarbonation vessel 510*c*. In other aspects, the flow path 566 can lead to a different section of the lithium carbonate production unit 509, such as the first crystallizer 510*a* or the second crystallizer 510*e*.

In some aspects, rather than passing through the secondary crystallizer 530 and the secondary centrifugal separator 532, the secondary lithium-rich stream 598 can rejoin the main processing stream, such as by intermixing with flow path 250. Because the secondary lithium-rich stream 598 contains minimal amounts of sodium and potassium, intermixing of the secondary lithium-rich stream 598 can avoid substantially increasing the concentrations of these ions within the main processing stream 197.

Figure 6:
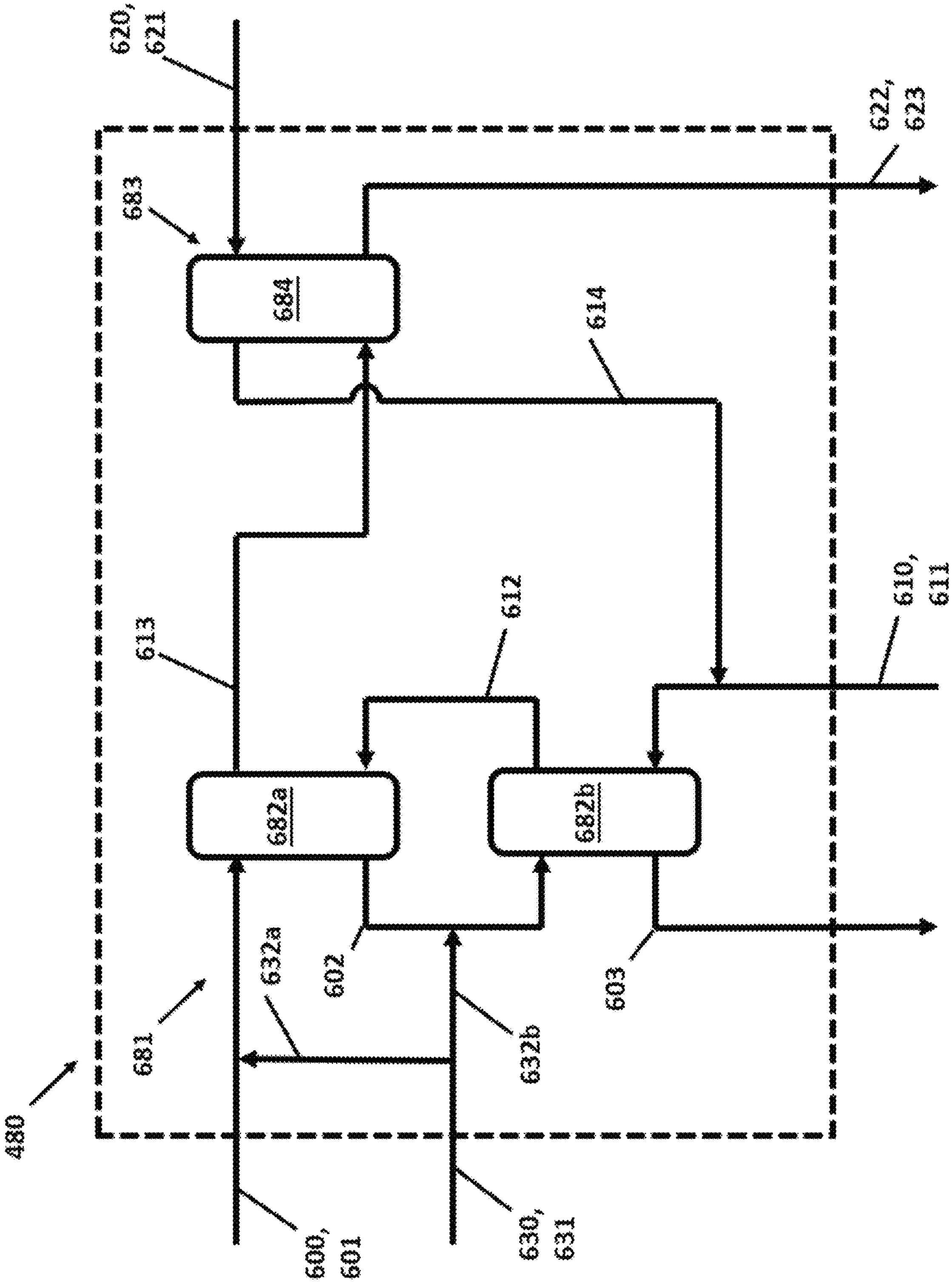
FIG. 6 is a detailed process diagram of an exemplary solvent extraction unit of the improved production circuit of the aspects of FIGS. 4 and 5.

FIG. 6 is a process diagram of one exemplary aspect of the solvent extraction unit 480 in accordance with one aspect of the present disclosure.

The solvent extraction unit 480 can comprise an extraction circuit 681 and a stripping circuit 683. In the present aspect, the extraction circuit 681 can be a two-stage extraction process, though this should not be viewed as limiting. In various aspects, the extraction circuit 681 and/or the stripping circuit 683 can have greater or fewer than two stages. In the present aspect, the extraction circuit 681 and the stripping circuit 683 can be counter-flow circuits, although this should not be viewed as limiting.

As shown, an aqueous feed stream 600 can be supplied to the solvent extraction unit 480 along a flow path 601. In relation to the improved production circuit 415 of FIG. 4, the aqueous feed stream 600 can be the main processing stream 197 passing along the flow path 250 to the solvent extraction unit 480 (see FIG. 4). In relation to the improved production circuit 515 of FIG. 5, the aqueous feed stream 600 can be the waste-water stream 199 travelling from the lithium carbonate production unit 509 (such as flow paths 117,119) to the solvent extraction unit 480 (see FIG. 5). Upon entering the solvent extraction unit 480, the aqueous feed stream 600 can carry substantial amounts of aqueous lithium.

An alkali 630, such as sodium hydroxide for example and without limitation, can be added to the aqueous feed stream 600 to control the pH of the aqueous feed stream 600, as demonstrated by a flow path 631 and a flow path 632*a*. In some aspects, the alkali 630 can be added to achieve a pH for the aqueous feed stream 600 of 10.0-12.5. In more preferable aspects, the alkali 630 can be added to achieve a pH for the aqueous feed stream 600 of 10.5-12.0. In most preferable aspects, the alkali 630 can be added to achieve a pH for the aqueous feed stream 600 of 11.0-11.5. In practice, an approximately stoichiometrically equivalent amount of alkali 630 can be added relative to the amount of aqueous lithium entering the solvent extraction unit 480 in the aqueous feed stream 600.

A solvent stream 610, also referred to as an "organic solvent stream," can be supplied to the solvent extraction unit 480, as shown by a flow path 611. This stream can comprise a solvent. The solvent can comprise at least one diluent and at least one extractant. The at least one diluent can comprise at least one organic diluent. The at least one extractant can be dissolved in the at least one diluent. The at least one diluent can carry the extractant(s) and facilitate contact between the extractant(s) and the sulfate aqueous brine. In some aspects, the solvent can further comprise at least one modifier. Addition of at least one modifier can increase efficiency of the solvent extraction unit 480 in some aspects. At least one modifier can be utilized for purposes such as, for example and without limitation, to help prevent unwanted phase formation, increase the solubility of the extractant in the diluent, or decrease extractant losses to the aqueous phase. During testing, organic solvent blends, such as Cyanex 923 (manufactured by Solvay S.A. of Brussels, Belgium) and Mextral 54-100 (manufactured by KopperChem of Chongqing, China) were tested. Cyanex 923 comprises a blend of compounds, such as trialkylphosphine oxides. Specifically, Cyanex 923 extractant can comprise a mixture of four trialkylphosphine oxides as follows: R3P(O) R2R'P(O) RR'2P(O) R'3P(0), where R=[CH3(CH2)7]-normal octyl, and R'=[CH3(CH2)7]-normal hexyl. Mextral 54-100 comprises a mixture of β-diketone 1-benzoyl-2-nonanone (as main ingredient), surfactant, modifier, stabilizer, and other compounds. In some aspects, these solvents were blended with a diluent, such as Exxsol D80 (manufactured by ExxonMobil of Irving, TX, USA). Exxsol D80 is a dearomatized hydrocarbon fluid. In practice, any organic solvent(s) (or blends thereof) suited for selectively binding lithium to remove it from the aqueous phase and into the organic phase in the presence of additional monovalent species, such as sodium and potassium for example and without limitation, can be utilized. In some aspects, the solvent can be paraffinic, as opposed to aromatic for example and without limitation.

The aqueous feed stream 600 and the solvent stream 610 can pass through a first extraction vessel **682*a* and a second extraction vessel 682*b*. In the present aspect, the aqueous feed stream 600 and the solvent stream 610 can pass through the first extraction vessel 682*a* and the second extraction vessel 682*b* in countercurrent flow. For example, the aqueous feed stream 600 can enter the first extraction vessel 682*a* along the flow path 601, exit the first extraction vessel 682*a* and then enter the second extraction vessel 682*b* along a flow path 602, and then exit the second extraction vessel 682*b* (and the solvent extraction unit 480) along a flow path 603. In some aspects, additional alkali 630 can be injected through flow path 632*b* into the flow path 602 to adjust the pH as needed. The aqueous feed stream 600 exiting along the flow path 603 can be depleted of lithium, such that the aqueous feed stream 600** becomes a waste-water stream.

With respect to the improved production circuit 415 of FIG. 4, the aqueous feed stream 600 exiting along the flow path 603 can form the waste-water stream 199 and flow to the ZLD unit **412*a* of the waste-salt separation unit 411 (see FIG. 4). With respect to the improved production circuit 515 of FIG. 5 wherein the waste-water stream 199 can be treated by the solvent extraction unit 480, the aqueous feed stream 600 exiting along the flow path 603 can flow to the ZLD unit 512*a* of the waste-salt separation unit 511 (see FIG. 5**).

By contrast, the solvent stream 610 can enter the second extraction vessel **682*b* along the flow path 611, exit the second extraction vessel 682*b* and then enter the first extraction vessel 682*a* along a flow path 612, and then exit the first extraction vessel 682*a* and being directed to the stripping circuit 683 along a flow path 613. The solvent stream 610 entering the stripping circuit 683 can carry substantially all of the lithium (dissolved in the organic phase) that entered the solvent extraction unit 480 in the aqueous feed stream 600 (dissolved in the aqueous phase). In some aspects, rather than passing the entire solvent stream 610 through both extraction vessels 682*a,b*, a first portion of the solvent stream 610 can be routed only through the first extraction vessel 682*a* and a second portion of the solvent stream 610 can be routed only through the second extraction vessel 682*b*. Each portion of the solvent stream 610 can then flow to the stripping circuit 683. In some aspects, the solvent stream 610 can first pass through the first extraction vessel 682*a* countercurrent to the aqueous feed stream 600 and then pass through the second extraction vessel 682*b*** countercurrent to the aqueous feed stream.

The solvent stream 610 can selectively extract the lithium from the aqueous phase of the aqueous feed stream 600 and into the organic phase of the solvent stream 610. The volumetric ratio of the organic phase (the solvent stream 610) to the aqueous phase (the aqueous feed stream 600)(the "O/A ratio") within the extraction circuit 681 can be from 5/1 to 1/5. Preferably, the O/A ratio can be from 1/2 to 1/1. Most preferably, the O/A ratio can be approximately 2/3. The O/A ratio in the extraction circuit 681 can affect the percentage of lithium extracted from the aqueous feed stream 600 to the solvent stream 610. In some aspects, 95% or more of the lithium can be absorbed from the aqueous phase to the organic phase, leaving 5% or less of the lithium in the aqueous feed stream 600 exiting along the flow path 603. In preferred aspects, 99% or more of the lithium can be extracted from the aqueous phase to the organic phase, leaving 1% or less of the lithium in the aqueous feed stream 600 exiting along the flow path 603. In most preferred aspects, 99.9% or more (roughly 100%) of the lithium can be extracted from the aqueous phase to the organic phase, leaving 0.1% or less of the lithium in the aqueous feed stream 600 exiting along the flow path 603. With an O/A ratio of 2/3, roughly 100% of the lithium can be extracted to the organic phase. In some aspects, the O/A ratio can affect the number of stages required for complete absorption of the lithium. For example and without limitation, with an O/A ratio of 2/3, two extraction stages may be required for roughly 100% extraction of lithium to the organic phase. For example and without limitation, with an O/A ratio of 1/2, three extraction stages may be required for roughly 100% absorption of lithium to the organic phase. The preferred O/A ratios can be affected over time by the relative costs of equipment and extractants. For example and without limitation, if extractant costs are high, it can be desirable to operate at a lower O/A ratio (i.e. lower extractant costs) with more stages (i.e. more equipment costs). For example and without limitation, if extractant costs are low, it can be desirable to operate at higher O/A ratios with fewer stages.

In the stripping circuit 683, the lithium-loaded solvent stream 610 can be contacted with an aqueous acid stream 620, supplied by a flow path 621. In the present aspect, the aqueous acid stream 620 can comprise sulfuric acid. In the present aspect, the solvent stream 610 can be contacted with the aqueous acid stream 620 in a stripping vessel 684. In some aspects, the solvent stream 610 can be contacted with the aqueous acid stream 620 in multiple phases comprising multiple stripping vessels. In the present aspect, the solvent stream 610 can be contacted with the aqueous acid stream 620 in countercurrent flow.

The aqueous acid stream 620 can strip the lithium from the organic phase of the solvent stream 610 and re-claim the lithium into the aqueous phase of the aqueous acid stream 620 to create an aqueous lithium-rich stream 623. By supplying sulfuric acid at 100% the stoichiometric proportion to the amount of lithium in the solvent stream 610, roughly 100% of the lithium can be extracted into the aqueous acid stream 620. In practice, it can be desirable to supply 110% of the stoichiometric proportion to the amount of lithium in the solvent stream 610. The O/A ratio of the solvent stream 610 to the aqueous acid stream 620 within the stripping vessel 684 can be from 7/1 to 1/1. Preferably, the O/A ratio can be from 6/1 to 2/1. Most preferably, the O/A ratio can be approximately 4/1.

The aqueous lithium-rich stream 623 (carrying roughly 100% of the lithium initially introduced into the solvent extraction unit 480 in the aqueous feed stream 600) can exit the stripping vessel 684 and the solvent extraction unit 480 along a flow path 622. With regard to the improved production circuit 415 of FIG. 4, the flow path 622 can route the lithium-rich stream 198 to the crystallizer **410*a* of the lithium carbonate production unit 409 (shown in FIG. 4). With regard to the improved production circuit 515 of FIG. 5, the flow path 622 can route the secondary lithium-rich stream 598 to the secondary crystallizer 530**.

The solvent stream 610 can exit the stripping vessel 684 substantially devoid of lithium. The majority of the solvent stream 610 can be recycled, as shown by a flow path 614 wherein the solvent stream 610 can rejoin the flow path 611 after exiting the stripping vessel 684. A small portion of the solvent stream 610 can be lost in the process, which can be replenished by injection of additional extractant(s) and/or diluent(s) into the solvent extraction unit 480 along flow path 611. In some aspects, any organic components present in the aqueous waste stream can be subsequently removed. In some aspects, a technology such as an activated carbon filter, for example and without limitation, can be used to remove organics from an aqueous stream. This can be desirable in aspects wherein the presence of organics in an aqueous stream can cause issues in downstream processing steps (e.g. foaming, coloration, or other issues) and/or when required by applicable aqueous waste control standards from local or federal environmental protection regulations, for example and without limitation.

The table, below, contains one example of experimental results for the chemical compositions of the aqueous feed stream 600 and the aqueous lithium-rich stream 623:

| | Aqueous feed stream 600 composition | Aqueous lithium-rich stream 623 composition | Concentration Factor |
|---|---|---|---|
| Lithium concentration | 2410 ppm | 18,000 ppm | ~7.47× |
| Sodium concentration | 19,502 ppm | 6,800 ppm | ~0.35× |
| Potassium concentration | 15,476 ppm | 600 ppm | ~0.04× |

In the example shown, the final concentration of lithium in the aqueous lithium-rich stream 623 can be 7.47× the initial concentration of lithium in the aqueous feed stream 600. The concentration factor can vary, such as depending upon the O/A ratios utilized in the extraction circuit 681 and the stripping circuit 683. In some aspects, the concentration factor for the lithium concentration can be greater than or equal to 3×. In preferred aspects, the concentration factor for the lithium concentration can be greater than or equal to 5×. In most preferred aspects, the concentration factor for the lithium concentration can be greater than or equal to 7×.

Notably, the concentration factors for the sodium concentration and potassium concentration can be less than 1, denoting a decrease in concentration for those respective cations from their initial concentrations in the aqueous feed stream 600 to their final concentration in the aqueous lithium-rich stream 623.

In some aspects, the concentration factor for the sodium concentration can be less than or equal to 0.5×. In preferred aspects, the concentration factor for the sodium concentration can be less than or equal to 0.35×. In most preferred examples, the concentration factor for the sodium concentration can be less than or equal to 0.10×.

In some aspects, the concentration factor for the potassium concentration can be less than or equal to 0.15×. In preferred aspects, the concentration factor for the potassium concentration can be less than or equal to 0.10×. In most preferred examples, the concentration factor for the potassium concentration can be less than or equal to 0.04×.

Because of the high purity of the chemical composition of the aqueous lithium-rich stream 623, the aqueous lithium-rich stream 623 can be suited for producing lithium-carbonate or lithium hydroxide of sufficient purity to meet criteria for battery applications. The improved lithium extraction process 400, 500 can also be utilized for producing salable lithium-carbonate or lithium hydroxide from brines containing other monovalent species of cations, such as rubidium and/or cesium.

As noted above, the waste-water stream 199 exiting the solvent extraction unit 480 along flow path 603 can be devoid of lithium, which allows waste-salts to be completely separated from the waste-water stream 199 in a linear process without the loss of more than trace amounts of lithium. By avoiding the need for a recycle loop in the treatment of the waste-water stream 199, resource consumption can be substantially reduced. For example, acid consumption, such as sulfuric acid consumption, can be reduced for a cost savings, or the saved acid can be repurposed for the acid leaching step 104, which can result in a 3-5% improvement in lithium recovery from the lithium ore. A loss of 2-3% of the lithium with the separation of sodium and potassium salts can also be avoided, thereby increasing production efficiency. Soda ash consumption can be reduced approximately 25-30%. Power consumption and overall cost of production can be reduced approximately 7% for the entire plant.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:

1. A lithium extraction system comprising:

a solvent extraction unit configured to receive an aqueous feed stream from an upstream flow path, the aqueous feed stream comprising lithium cations and at least one additional monovalent species of cation;

a waste-salt separation unit configured to receive an aqueous waste-water stream from a first downstream flow path, the first downstream flow path connecting the waste-salt separation unit in fluid communication with the solvent extraction unit; and a lithium carbonate production unit configured to receive an aqueous lithium-rich stream from a second downstream flow path, the second downstream flow path connecting the lithium carbonate production unit in fluid communication with the solvent extraction unit, wherein the waste-salt separation unit is configured to completely separate waste salts as a solid product from the aqueous waste-water stream in a linear process.

2. The lithium extraction system of claim 1, wherein the solvent extraction unit comprises:

an extraction circuit configured to contact the aqueous feed stream with an organic solvent stream to extract the lithium cations from the aqueous feed stream to the organic solvent stream; and a stripping circuit configured to contact the organic solvent stream with an aqueous acid stream to strip the lithium cations from the organic solvent stream to the aqueous acid stream.

3. The lithium extraction system of claim 1, wherein the at least one additional monovalent species of cation comprises sodium cations.

4. The lithium extraction system of claim 1, wherein the at least one additional monovalent species of cation comprises potassium cations.

5. The lithium extraction system of claim 1, wherein:

the aqueous feed stream comprises an initial concentration of lithium cations;

the aqueous lithium-rich stream comprises a final concentration of lithium cations; and the final concentration of lithium cations is greater than or equal to 3×the initial concentration of lithium cations.

6. The lithium extraction system of claim 5, wherein the final concentration of lithium is greater than or equal to 5×the initial concentration of lithium cations.

7. The lithium extraction system of claim 5, wherein the final concentration of lithium is greater than or equal to 7×the initial concentration of lithium cations.

8. The lithium extraction system of claim 5, wherein a remaining concentration of lithium cations in the aqueous waste-water stream is equal to or less than 0.01×the initial concentration of lithium cations.

9. The lithium extraction system of claim 5, wherein:

the aqueous feed stream comprises an initial concentration of sodium cations;

the aqueous lithium-rich stream comprises a final concentration of sodium cations; and the final concentration of sodium cations is less than or equal to 0.5× the initial concentration of sodium cations.

10. The lithium extraction system of claim 5, wherein:

the aqueous feed stream comprises an initial concentration of sodium cations;

the aqueous lithium-rich stream comprises a final concentration of sodium cations; and the final concentration of sodium cations is less than or equal to 0.35× the initial concentration of sodium cations.

11. The lithium extraction system of claim 5, wherein:

the aqueous feed stream comprises an initial concentration of potassium cations;

the aqueous lithium-rich stream comprises a final concentration of potassium cations; and the final concentration of potassium cations is less than or equal to 0.5× the initial concentration of potassium cations.

12. The lithium extraction system of claim 5, wherein:

the aqueous feed stream comprises an initial concentration of potassium cations;

the aqueous lithium-rich stream comprises a final concentration of potassium cations; and the final concentration of potassium cations is less than or equal to 0.05×the initial concentration of potassium cations.

* * * * *